United States Patent
Min et al.

(10) Patent No.: US 10,379,281 B2
(45) Date of Patent: Aug. 13, 2019

(54) LIQUID CRYSTAL DISPLAY DEVICE COMPRISING A PATTERN ADHESIVE LAYER INCLUDING HONEYCOMB SHAPED UNIT PATTERNS HAVING SEPARATION WALLS

(71) Applicant: LG DISPLAY CO., LTD., Seoul (KR)

(72) Inventors: Ju-Hun Min, Paju-si (KR); Young-Hun Jeong, Seoul (KR); Min-Gyu Choi, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 15/714,608

(22) Filed: Sep. 25, 2017

(65) Prior Publication Data
US 2018/0095217 A1 Apr. 5, 2018

(30) Foreign Application Priority Data
Sep. 30, 2016 (KR) .................. 10-2016-0126621

(51) Int. Cl.
*F21V 8/00* (2006.01)
*G02B 1/14* (2015.01)

(52) U.S. Cl.
CPC ............ *G02B 6/0055* (2013.01); *G02B 1/14* (2015.01); *G02B 6/0051* (2013.01); *G02B 6/0065* (2013.01); *G02B 6/0068* (2013.01); *G02F 2202/28* (2013.01)

(58) Field of Classification Search
CPC ........................ G02B 6/0065; G02F 2202/28
See application file for complete search history.

(56) References Cited

U.S. PATENT DOCUMENTS

| | | | | |
|---|---|---|---|---|
| 2008/0187715 A1* | 8/2008 | Wang | ................ | B32B 5/18 428/118 |
| 2014/0267980 A1* | 9/2014 | Kang | ................ | G02F 1/1336 349/62 |
| 2015/0170582 A1* | 6/2015 | Shimizu | ........... | G02F 1/133308 345/206 |
| 2015/0177540 A1* | 6/2015 | Araki | ............ | G02F 1/1339 349/42 |
| 2015/0378086 A1* | 12/2015 | Feng | .............. | G02B 6/0053 349/64 |
| 2016/0109637 A1* | 4/2016 | Teragawa | ......... | G02B 6/0055 349/65 |

FOREIGN PATENT DOCUMENTS

JP WO 2015151142 A1 * 10/2015 ........... G02B 6/0055

* cited by examiner

*Primary Examiner* — Paul C Lee
(74) *Attorney, Agent, or Firm* — Birch, Stewart, Kolasch & Birch, LLP (57) ABSTRACT

A liquid crystal display device in an example includes a light guide plate that includes a light entering surface facing a light source; a reflecting plate below the light guide plate; an optical sheet on the light guide plate; a liquid crystal panel on the optical sheet; and a pattern adhesive layer that attaches at least one of the reflecting plate and the optical sheet to the light guide plate, wherein the pattern adhesive layer includes honeycomb shaped unit patterns that each include two first separation walls facing each other in a first direction perpendicular to the light entering surface, and second separation walls other than the first separation walls and each have an air cell defined therein, and wherein the unit patterns are arranged in the first direction and in a second direction perpendicular to the first direction.

9 Claims, 7 Drawing Sheets

FIG. 3B light entering portion

LIQUID CRYSTAL DISPLAY DEVICE COMPRISING A PATTERN ADHESIVE LAYER INCLUDING HONEYCOMB SHAPED UNIT PATTERNS HAVING SEPARATION WALLS

CROSS REFERENCE TO RELATED APPLICATIONS

The present application claims the priority benefit of Korean Patent Application No. 10-2016-0126621 filed in Republic of Korea on Sep. 30, 2016, which is hereby incorporated by reference in its entirety for all purposes as if fully set forth herein.

BACKGROUND OF THE INVENTION

Field of the Invention

The present invention relates to a liquid crystal display device, and particularly, relates to a liquid crystal display device which can effectively achieve an integration structure of optical parts of a backlight unit.

Discussion of the Related Art

Facing information society, needs for display devices have increased variously. Recently, flat display devices, such as a liquid crystal display (LCD) device, a plasma display panel (PDP) device, and an organic light emitting diode (OLED) display device, are used.

Among these display devices, LCD devices are widely used because of advantages in a lightweight, a thin profile, a low power consumption and the like.

The LCD device includes a liquid crystal panel, and a backlight unit below the liquid crystal panel.

As the LCD device becomes slim, the backlight unit is required to be slim. Accordingly, an edge type backlight unit, which has a light source located at a side thereof, is widely used.

The edge type backlight unit includes an LED as a light source, a light guide plate having a light entering surface facing the LED, a reflecting plate below the light guide plate, and an optical sheet on the light guide plate.

Since the backlight unit has many optical parts, in order to reduce assembling processes and prevent movement of the optical parts, a solution of integrating at least parts of the reflecting plate, the light guide plate and the optical sheet has been proposed.

However, the integration structure according to the related art is achieved by a very simple manner of integrating optical parts with adhesives coated on the entire surfaces thereof without considering light distribution of the backlight unit.

Accordingly, light distribution property is degraded. For example, a light is biased around a light entering portion of the backlight unit.

SUMMARY OF THE INVENTION

Accordingly, the present invention is directed to an LCD device that substantially obviates one or more of the problems due to limitations and disadvantages of the related art.

An object of the present invention is to provide an LCD device that can effectively achieve an integration structure of optical parts of a backlight unit.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described herein, a liquid crystal display device includes a light guide plate that includes a light entering surface facing a light source; a reflecting plate below the light guide plate; an optical sheet on the light guide plate; a liquid crystal panel on the optical sheet; and a pattern adhesive layer that attaches at least one of the reflecting plate and the optical sheet to the light guide plate, wherein the pattern adhesive layer includes honeycomb shaped unit patterns that each include two first separation walls facing each other in a first direction perpendicular to the light entering surface, and second separation walls other than the first separation walls and each have an air cell defined therein, and wherein the unit patterns are arranged in the first direction and in a second direction perpendicular to the first direction.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to exemplary embodiments, examples of which are illustrated in the accompanying drawings. The same reference numbers may be used throughout the drawings to refer to the same or like parts.

Figure 1:
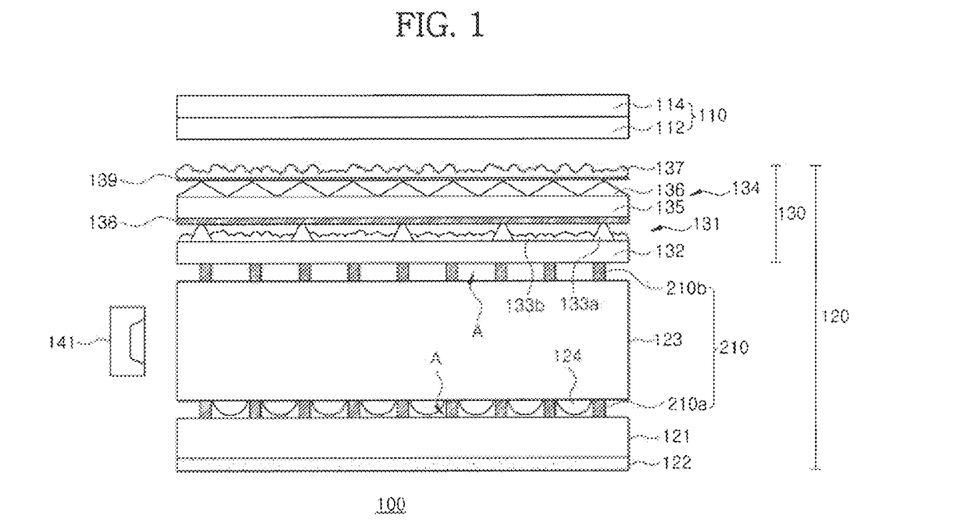
FIG. 1 is a cross-sectional view illustrating an LCD device according to an embodiment of the present invention.

FIG. 1 is a cross-sectional view illustrating an LCD device according to an embodiment of the present invention. All the components of the LCD device according to all embodiments of the present invention are operatively coupled and configured.

Referring to FIG. 1, an LCD device 100 includes a liquid crystal panel 110 and a backlight unit 120 below the liquid crystal panel 110.

The liquid crystal panel 110 is a component to display images, and includes first and second substrates 112 and 114 facing each other, and a liquid crystal layer therebetween.

Further, on an inner surface of the first substrate 112 that may be referred to as a lower substrate or an array substrate, gate lines and data lines cross each other to define pixels, and a thin film transistor connected to the corresponding gate and data lines and a pixel electrode connected to the thin film transistor are formed in each pixel.

On an inner surface of the second substrate 114 that may be referred to as an upper substrate or a color filter substrate, a color filter pattern corresponding to each pixel and a black matrix surrounding the color filter pattern and corresponding to the gate line, the data line and the thin film transistor are formed.

All types of liquid crystal panels may be available as the liquid display panel 110. For example, an IPS type, AH-IPS type, TN type, VA type, or ECB type liquid crystal panel may be used. In case of the IPS type or AH-IPS type, a common electrode to produce an in-plane electric field along with a pixel electrode is formed at the first substrate 112.

Each of the first and second substrates 112 and 114 may include an alignment layer contacting the liquid crystal layer to align liquid crystal molecules. A seal pattern may be formed between peripheries of the first and second substrates 112 and 114.

Further, a polarization plate may be attached to at least one of the first and second substrates 112 and 114.

A printed circuit board may be connected to at least one side of the liquid crystal panel 110 through a flexible circuit film or the like.

The backlight unit 120 includes a reflecting plate 121, a light guide plate 123 on the reflecting plate 121, at least one optical sheet 130 on the light guide plate 123, and LEDs 141 as a light source. The LEDs 141 correspond to a light entering surface as a side surface of the light guide plate 123 and are arranged in a length direction of the light entering surface.

The LEDs 141 may be mounted on a printed circuit board and be arranged in a length direction of the printed circuit board.

The reflecting plate 121 may have a white color or silver color for a light reflection. The reflecting plate 121 is located below the light guide plate 123, and functions to reflect a light, that passes through a bottom surface of the light guide plate 123, toward the liquid crystal panel 110 to increase brightness.

In this embodiment, the reflecting plate 121 may be attached to the light guide plate 123 through a pattern adhesive layer 210, i.e., a first pattern adhesive layer 210a, for example as a patterned adhesive member.

A light from the LED 141 enters the light guide plate 123 through the light entering surface, then travels in the light guide plate 123 by several total reflections to spread uniformly, and then is output from the light guide plate 123 toward the liquid crystal panel 110.

The light guide plate 123 may include a light output pattern 124 at a bottom surface facing the reflecting plate 121. The light output pattern 124 is a component that serves to increase light output efficiency of the light guide plate 123. The light output pattern 124 may be formed to have, for example, a hemisphere shape, polygon shape or the like.

In order to make the backlight unit 120 thin and effectively make the LCD device slim, the light guide plate 123 may be preferably made of glass.

In this regard, a polymer material such as PMMA is weak to a heat, and when the light guide plate 123 is formed thinly using a polymer material, much thermal expansion or thermal contraction happens to the light guide plate 123 thus reliability is problematic.

However, when the light guide plate 123 is made of glass, a thermal expansion or thermal contraction is minimized because of glass property, and reliability can be improved.

Further, glass has a hardness greater than polymer material. Accordingly, the backlight unit 120 including the light guide plate 123 made of glass can have an improved hardness. Thus, when the backlight unit 120 is configured in an integration structure, there can be an advantage that a bottom cover as a structural part to protect a bottom of the backlight unit 120 may be eliminated from the LCD device 100.

In the case that the bottom cover is removed from the LCD device 100, in order to protect a bottom portion of the LCD device 100, a protection film 122 may be attached to a bottom surface of the reflecting plate 121. In this case, in view of an exterior product appearance of the LCD device, the protection film 122 may have a decoration pattern at a bottom surface as an outer surface thereof. As such, the protection film 122 functions to protect the reflecting plate 121 and provide an exterior product appearance.

The at least one optical sheet 130 may be located on the light guide plate 123. When a plurality of optical sheets 130 are used, by way of example, first and second optical sheets 131 and 134 may be located on the light guide plate 123.

The first optical sheet 131 may be, for example, a diffusion sheet 131. The diffusion sheet 131 may be configured to include a base layer 132, which is made of a polymer material such as PET, and diffusion patterns on the base layer 132. The diffusion patterns may include different types of patterns having different shapes and sizes. For example, first diffusion patterns 133a, which have a first size and are spaced apart from each other, and second diffusion patterns 133b, which are located at regions between the first diffusion patterns 133a, have a second size less than the first size and have an irregular beads shape, may be used. When using the different types of diffusion patterns 133a and 133b, a light diffusion property can be improved.

The second optical sheet 134 may be, for example, a prism sheet 134. The prism sheet 134 may be configured to include a base layer 135, which is made of a polymer material such as PET, prism patterns 136 on the base layer 135.

The first and second optical sheets 131 and 134 may be attached to each other using an adhesive layer 138 and form an integration structure. Accordingly, an integration structure of the optical sheets 130 can be achieved.

A diffusion pattern layer 137 may be formed on a top surface of the second optical sheet 134, and be attached to the second optical sheet 134 using an adhesive layer 139. In this case, any base layer for the diffusion layer 137 may not be provided. The diffusion pattern layer 137 diffuses a light condensed by the second optical sheet 134 and supplies a more uniformly distributed light to the liquid crystal panel 110. When the diffusion pattern layer 137 is formed on a top surface of the second optical sheet 134 without using a base layer, a thickness of an integrated optical sheet 130 can be reduced compared with a case of configuring a diffusion pattern layer in a film type.

The optical sheet 130 may be attached to a top surface of the light guide plate 123 through the pattern adhesive layer 210, i.e., a second pattern adhesive layer 210b, for example as a patterned adhesive member. That is, the pattern adhesive layer 210 includes the first and second pattern adhesive layers 210a and 210b. The light guide plate 123, separate from the pattern adhesive layer 210, is provided between the first and second pattern adhesive layers 210a and 210b.

As described above, when the reflecting plate 121 is attached to the bottom surface of the light guide plate 123 using the first pattern adhesive layer 210a and the optical sheet 130 is attached to the top surface of the light guide plate 123 using the second pattern adhesive layer 210b, the backlight unit 120 can be configured entirely in an integration structure that all parts thereof are integrated. Alternatively, the backlight unit 120 may be configured such that an optical part located over or below the light guide plate 123 is attached to, and integrated with, the light guide plate 123.

Particularly, the pattern adhesive layer 210 has a patterned structure such that air cells A, as air spaces, are formed therein, and can secure a light distribution property.

Figure 2:
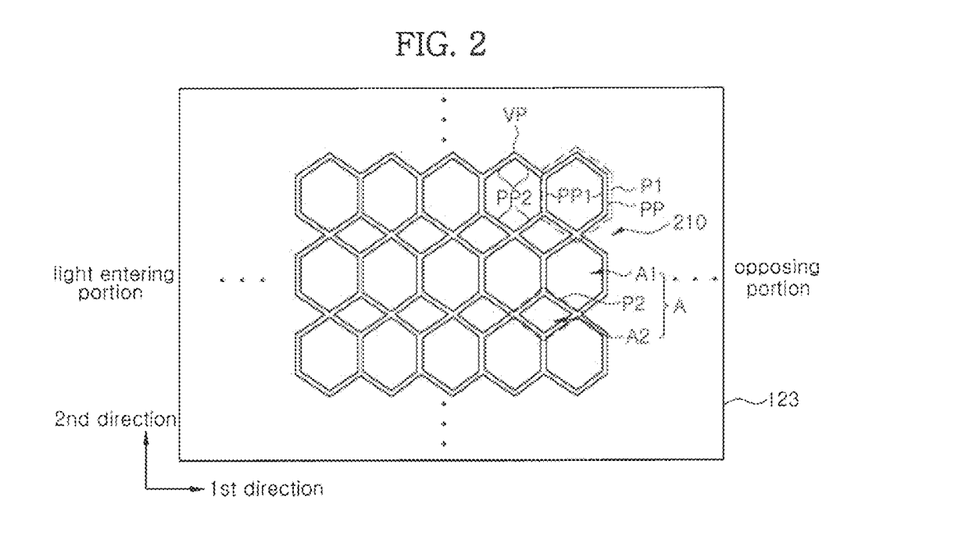
FIG. 2 is a schematic view illustrating a pattern adhesive layer according to an embodiment of the present invention.

For example, FIG. 2 is a schematic view illustrating an example of the pattern adhesive layer 210 according to an embodiment of the present invention. For the purpose of explanations, a direction from a light entering portion, which is a side surface portion, where the LEDs 141 are arranged, of the light guide plate 123, to an opposing portion which is an opposing side surface portion of the light guide plate 123 is a first direction, and a direction, on a plane of the light guide plate 123, perpendicular to the first direction is a second direction.

Referring to FIG. 2, the pattern adhesive layer 210 (i.e., at least one of the first and second pattern adhesive layers 210a and 210b) is a patterned adhesive layer that includes the air cells A. The pattern adhesive layer 210 may be made of an optical adhesive, for example, an OCA (optically clear adhesive). The pattern adhesive layer 210 may have a refractive index substantially equal to or very close to that of the light guide plate 123 such that it is attached to the light guide plate 123 and functions to improve an optical property.

The pattern adhesive layer 210 may be configured with unit patterns P1 that are honeycomb shaped patterns and each include a first air cell A1, as a hexagonal air space, therein. The unit patterns P1 are arranged in the first and second directions.

By the arrangement of the unit patterns P1, in the pattern adhesive layer 210, the first air cells A1 and tetragonal second air cells A2 different from the first air cells A1 can be formed.

In detail, for example, the unit pattern P1 has a honeycomb structure and is configured with six separation walls PP. For the purpose of explanations, the two opposing separation walls perpendicular to the first direction (i.e., parallel with the second direction) are first separation walls PP1, and other four separation walls are second separation walls PP2. In other words, the first separation walls PP1 are arranged in the first direction.

The unit patterns P1 may be arranged in the first direction such that the neighboring unit patterns P1 share the first separation wall PP1. The unit patterns P1 may be arranged in the second direction such that the neighboring unit patterns P1 share an apex VP between the neighboring second separation walls PP2.

In other words, the unit patterns P1 may be arranged in a matrix form to share the separation walls PP in the first direction and share the apexes VP in the second direction.

By the arrangement of the unit patterns P1, the pattern adhesive layer 210 can be considered to be substantially configured with first patterns P1, as the unit patterns P1, which each define the first air cell A1 therein and are configured with the two first separation walls PP1 and the four second separation walls PP2, and with tetragonal frame shaped second patterns P2 which each define a tetragonal second air cell A2 therein and are configured with the four second separation walls PP4.

In this embodiment, by applying the pattern adhesive layer 210 having the arrangement of the unit patterns on the top portion or bottom portion of the light guide plate 123, an integration structure of optical parts securing an adhesion force and a light distribution property can be effectively achieved.

This is explained in detail further with reference to FIGS. 3A to 6.

Figure 3A:
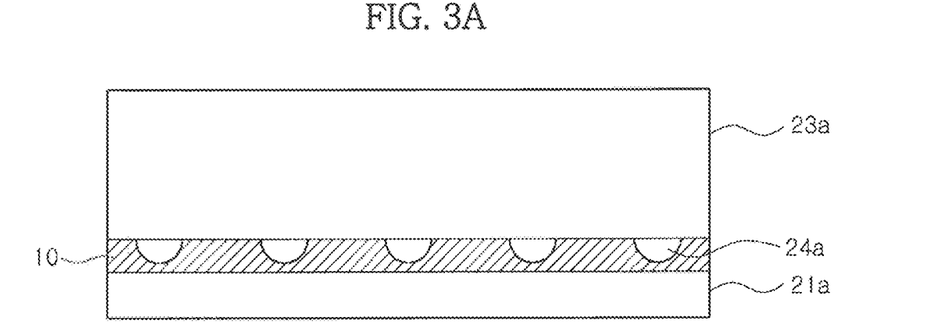
FIG. 3A is a schematic cross-sectional view illustrating a backlight unit of a first comparative example.
Figure 3B:
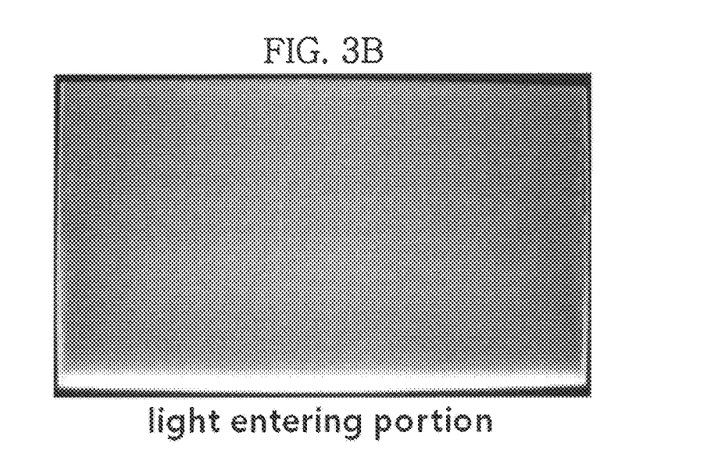
FIG. 3B is a picture illustrating a light bias happening at a light entering portion by the backlight unit of FIG. 3A.
Figure 4:
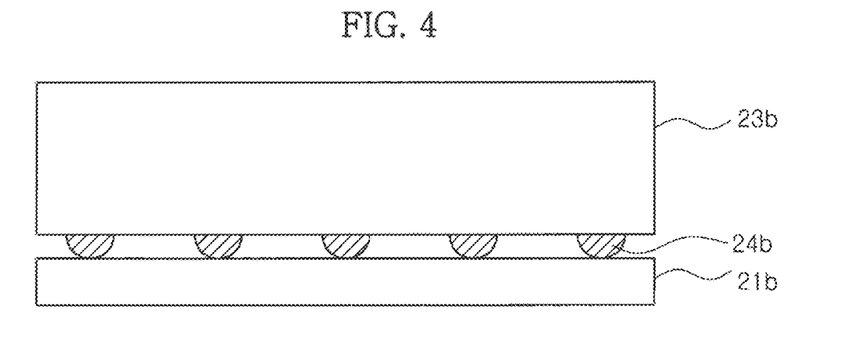
FIG. 4 is a schematic cross-sectional view illustrating a backlight unit of a second comparative example.

FIG. 3A is a schematic cross-sectional view illustrating a backlight unit of a first comparative example, and FIG. 3B is a picture illustrating a light bias happening at a light entering portion by the backlight unit of FIG. 3A. FIG. 4 is a schematic cross-sectional view illustrating a backlight unit of a second comparative example.

Figure 5:
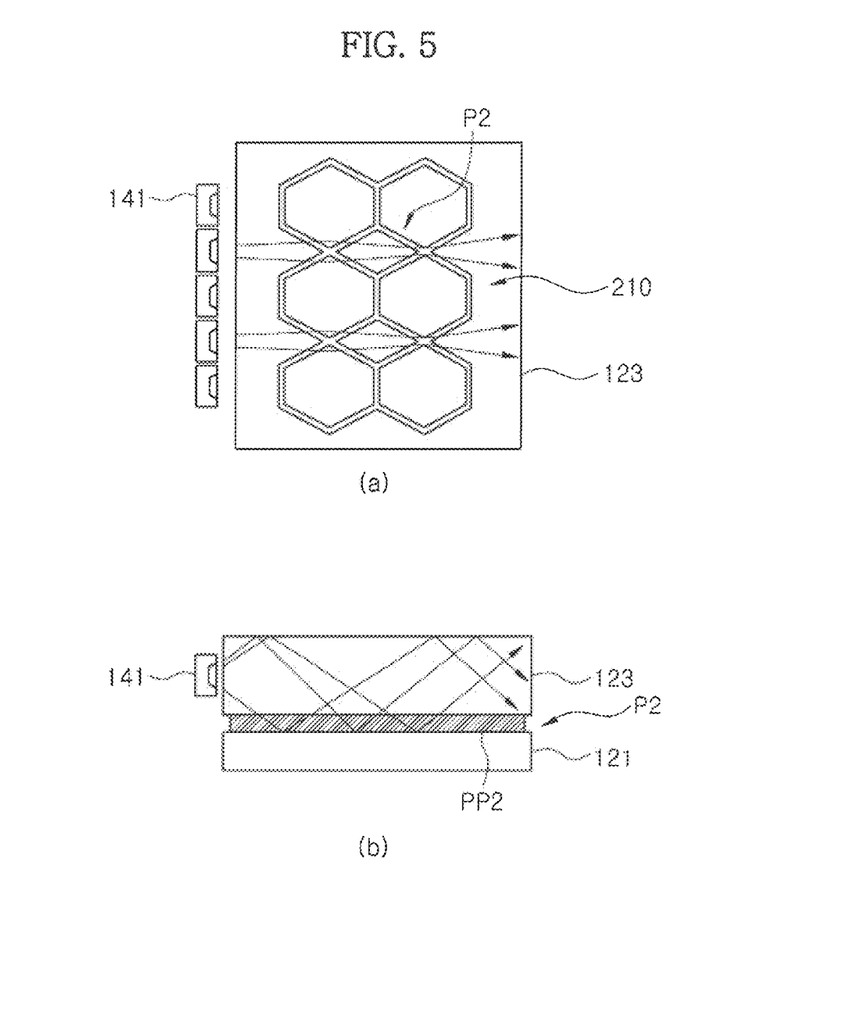
FIGS. 5 and 6 are schematic views illustrating light paths at a backlight unit according to an embodiment of the present invention.
Figure 6:
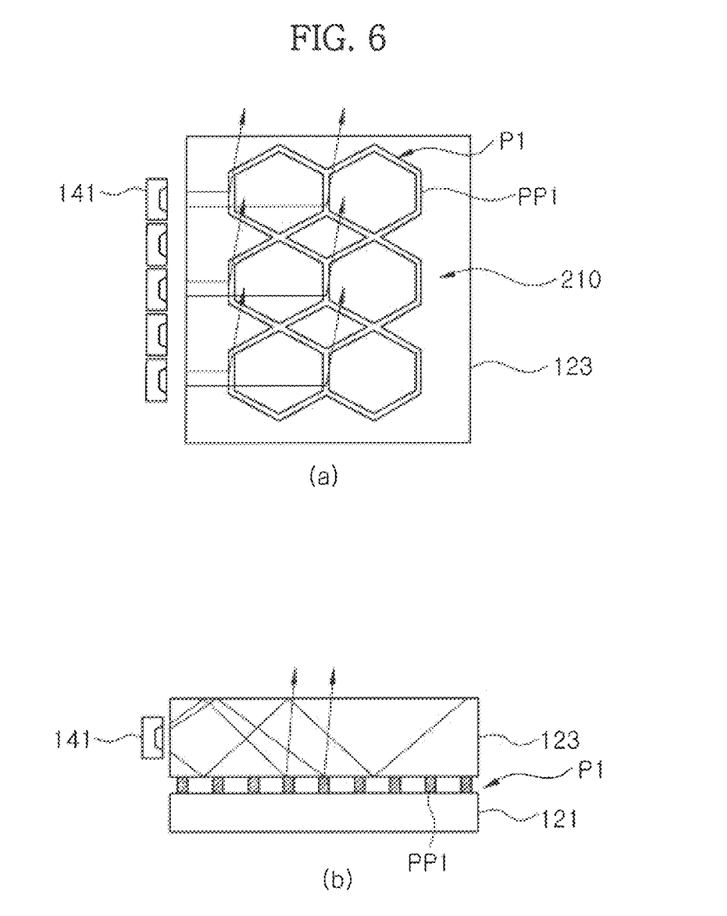

In contrast, FIGS. 5 and 6 are schematic views illustrating light paths at backlight unit (e.g., the backlight unit 120 in FIGS. 1 and 2) according to an embodiment of the present invention. FIG. 5 shows light paths through the second patterns P2, and FIG. 6 shows light paths through the first patterns P1.

The backlight unit of the first comparative example in FIG. 3A is configured such that a light guide plate 23a having light output patterns 24a at the bottom surface thereof and the reflecting plate 21a are attached entirely and closely to each other using an adhesive layer 10. In this backlight unit, an air space is not secured between the light guide plate 23a and the reflecting plate 21a, and thus, referring to FIG. 3B, a light bias at the light entering portion happens too much.

In a backlight unit of the second comparative example in FIG. 4, output patterns 24b of a light guide plate 23b are made of a material having an adhesive property. In this case, an air space is secured between the light guide plate 23b and a reflecting plate 21b. However, an adhesion area of the output patterns 24b is very small, an adhesion force between the light guide plate 23b and the reflecting plate 21b is not secured sufficiently.

In contrast, in the backlight unit of this embodiment, the light guide plate 123 and the reflecting plate 121 are attached to each other using the pattern adhesive layer 210 securing the air spaces therein. Accordingly, compared with the second comparative example, a sufficient adhesion area can be secured using the backlight unit of the embodiment(s) of the present invention.

Additionally, the light distribution property of the backlight unit can be improved by the pattern adhesive layer 210.

Referring to (a) and (b) of FIG. 5, the second patterns P2, i.e., the second separation walls PP2 of the second patterns P2, taken as a whole, have a type of an arrangement of extending in a zigzag shape along the second direction (i.e., the light guide direction of the light guide plate 123). This functions as an extension-type light guide pattern on the bottom surface of the light guide plate 123. Accordingly, a light is spread along the extension-type second patterns P2, and thus a total reflection light guide property from the light entering portion to the opposing portion can be improved. Therefore, a light distribution of the backlight unit can be uniform, and a light bias phenomenon at the entering portion can be improved.

Further, referring to (a) and (b) of FIG. 6, the first separation wall PP1 of the first pattern P1 is a pattern substantially perpendicular to the light guide direction and functions as a light output pattern that protrudes in a direction of thickness of the light guide plate 123. Accordingly, a light can be condensed and output in a height direction of the first separation wall PP1, thus a light condensing property of the backlight unit can increase, and thus a brightness of the backlight unit can increase.

Referring back to FIG. 1, the light output patterns 124 may be configured such that they are arranged at the air cells A1 of the corresponding first patterns P1. In this case, a structure that the first separation walls PP1 and the light output patterns 124 both serving a light output are arranged together can be obtained, and thus a light output property at the light guide plate 123 can be maximized.

As described above, when the integration structure is configured with the optical parts attached to the light guide plate 123 using the pattern adhesive layer 210, the integration structure securing the adhesion force and the light distribution property as well can be effectively achieved.

A preferable configuration of the unit pattern P1 to achieve the integration structure securing the adhesion force and the light distribution property is explained below.

Figure 7:
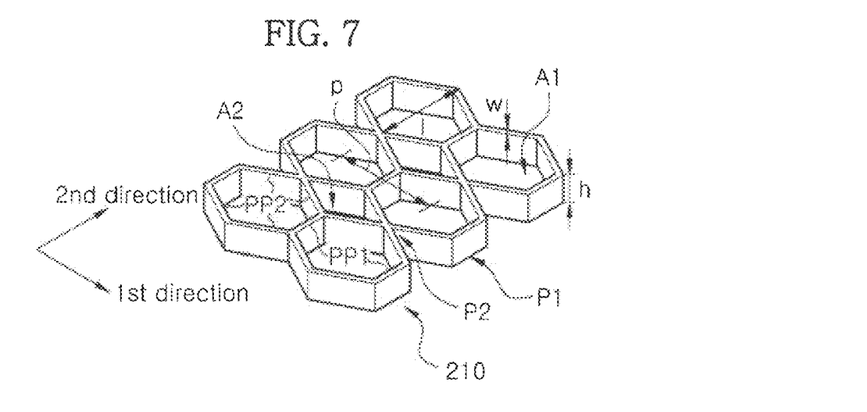
FIG. 7 is a view illustrating a structure of an unit pattern of a pattern adhesive layer according to an embodiment of the present invention.

Referring to FIG. 7 that shows a portion of the pattern adhesive layer 210 (e.g., at least one of the first and second pattern adhesive layers 210a and 210b), factors relating to the configurations of the unit pattern P1 are as follows: h is a height of the unit pattern P1 (i.e., a height of each of the separation walls P1 and P2), w is a width of the unit pattern P1 (i.e., a width of each of the separation walls P1 and P2), p is a pitch (or interval) between the unit patterns P1 in the first direction, and l is a length (or interval) of the unit pattern P1 in the second direction. A fill factor of the unit pattern P1 may be defined, for example, as (2w/p)*100%.

In order to secure the adhesion force and light distribution property in the integration structure of the unit pattern P1, it is preferable that a condition (1) below is satisfied.

$$4\% \leq \text{fill factor} \leq 5\% \text{ (i.e., } 40w \leq p \leq 50w\text{).} \qquad \text{Condition (1):}$$

The fill factor is preferably equal to or greater than 4%, and equal to or less than 5%, as shown in the condition (1). If the fill factor is less than 4%, an adhesion force is reduced.

This refers to Table 1 that shows experimental results of an adhesion force of an optical film to a fill factor of the pattern adhesive layer 210. The experiments are conducted with a width w of 15 um.

TABLE 1

| Fill factor | Pitch (p) | Width (w) | Result |
|---|---|---|---|
| 2% | 1500 um | 15 um | Entirely peeling (NG) |
| 3% | 1000 um | | Partially peeling (NG) |
| 4% | 750 um | | No peeling (OK) |

Referring to Table 1, when a fill factor is 2%, an entirely peeling of an optical film happens; when a fill factor is 3%, a partially peeling of an optical film happens; and when a fill factor is 4%, no peeling of an optical film happens.

Accordingly, in order to secure an adhesion force, it is preferable that the pattern adhesive layer 210 is formed with a fill factor, 4% or more.

Further, when the fill factor is less than 5%, a light distribution property is problematic.

Figure 8:
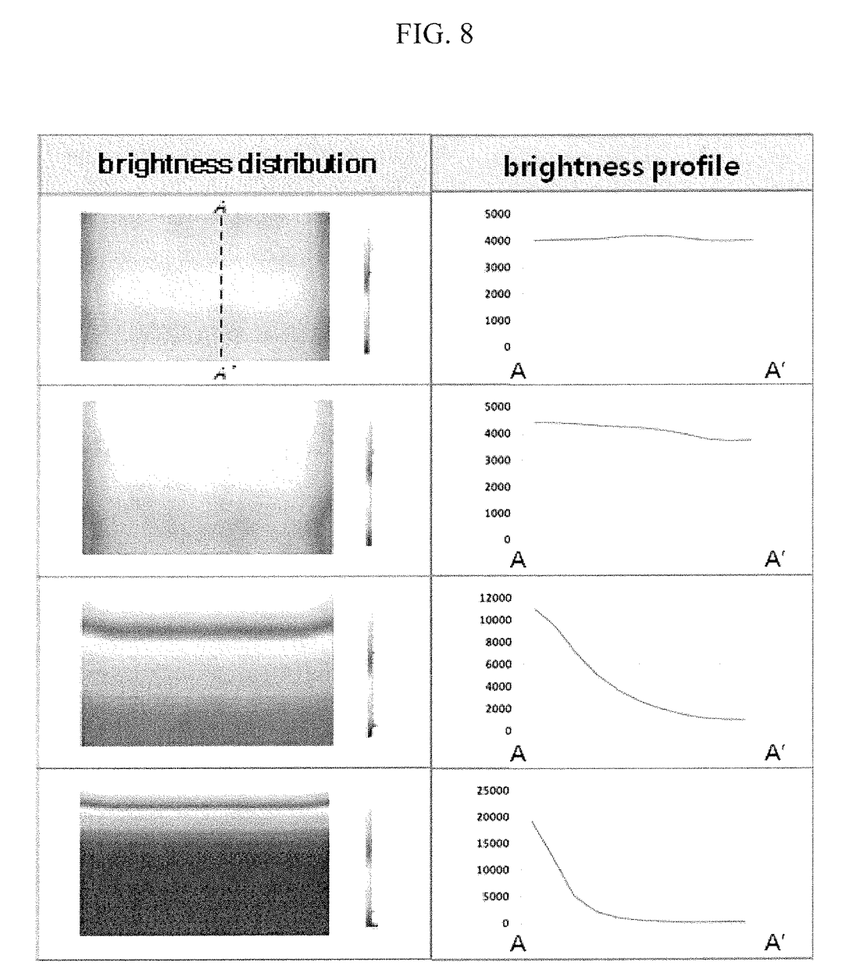
FIG. 8 is a view illustrating a brightness distribution and a brightness profile to a fill factor according to an embodiment of the present invention.
Figure 9:
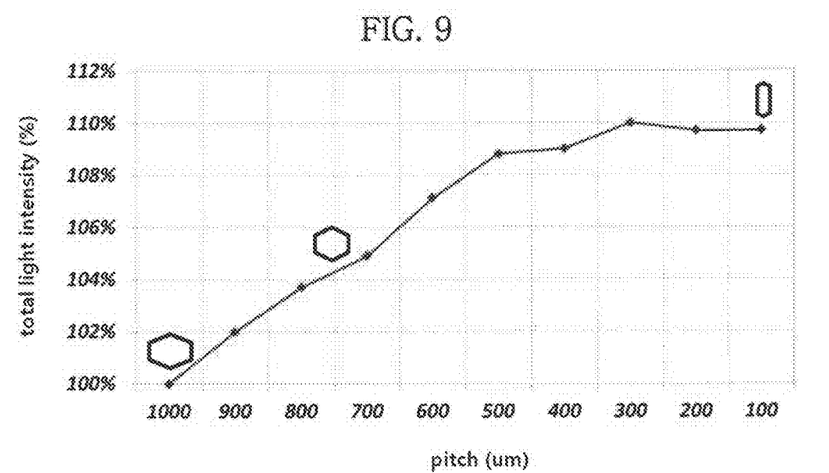
FIG. 9 is a view illustrating experimental results of a total light intensity to a pitch of a unit pattern of a pattern adhesive layer according to an embodiment of the present invention.

This refers to Table 2, which shows experimental results of a light distribution property of an optical film to a fill factor of the pattern adhesive layer 210, and refers to FIGS. 8 and 9. The experiments are conducted with a width w of 15 um. FIG. 8 is a view illustrating a brightness distribution and a brightness profile to a fill factor in Table 2, where a brightness profile is taken along a line A-A' of a brightness distribution, and A is at a side of a light entering portion and A' is at a side of an opposing portion. FIG. 9 is a view illustrating experimental results of a total light intensity to a pitch.

TABLE 2

| Fill factor | Pitch (p) | Width (w) | Uniformity | Result |
|---|---|---|---|---|
| 4% | 750 um | 15 um | 1.2 | OK |
| 5% | 600 um | | 1.33 | OK |
| 6% | 500 um | | 11.2 | NG |
| 7% | 430 um | | >20 | NG |

Referring to Table 2 and FIG. 8, when fill factors are 4% and 5%, uniformities are 1.2 and 1.3, respectively. In this case, a brightness distribution in a direction from the light entering portion to the opposing portion is entirely even, and a light distribution property is good.

In contrast, when fill factors are 6% and 7%, uniformities are 11.2 and over 20, respectively. In this case, a brightness distribution in a direction from the light entering portion to the opposing portion is rapidly reduced, and a light bias happens at a light entering portion, and thus the light distribution is bad.

Further, referring to FIG. 9, a total light intensity increases as a pitch decreases, and the total light intensity is saturated below about 325 um. In this case, even when the pitch is 750 um or less with the fill factor of 5% or less, the total light intensity of 100% or more as required can be achieved.

Accordingly, to secure the light distribution property, it is preferable that the pattern adhesive layer 210 is formed with the fill factor, 5% or less.

Based on the above experimental results, it is preferable that the pattern adhesive layer 210 is configured with the fill factor that is equal to or greater than 4% and is equal to or less than 5%, as shown in the condition (1).

The length l of the unit pattern P1 relates to a structure of the second pattern P2 that functions as a spread pattern (or diffusion pattern) to substantially increase a total reflection path. This is explained with reference to FIG. 10 that shows a graph of a total light intensity to the length l.

Figure 10:
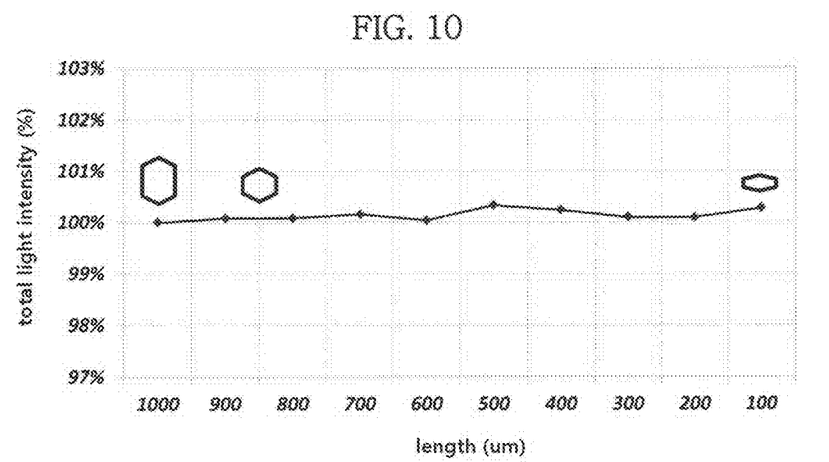
FIG. 10 is a graph illustrating experimental results of a total light intensity to a length of a unit pattern of a pattern adhesive layer according to an embodiment of the present invention.

Referring to FIG. 10, with the width w of 15 um, the length l of the unit pattern P1 is in a range of 100 um to 1000 um, a total light intensity meets 100%. Accordingly, the length l of the unit pattern P1 may be adjusted in a permissible range if needed.

Further, it is preferable that the pattern adhesive layer 210 satisfies a condition (2) below in order to maintain a gap of the air cells A1 and A2.

$$w \leq h \leq 2w. \qquad \text{Condition (2):}$$

In the condition (2), the height h of the unit pattern P1 is equal to or more than w, and is equal to or less than 2w.

According to this condition (2), a supporting force of the unit pattern P1 to maintain the gap of the air cells A1 and A2 can be sufficiently secured.

As described above, in integrating the optical parts of the backlight unit according to one or more embodiments of the present invention, the optical part(s) located over and/or below the light guide plate are attached to the light guide plate using the pattern adhesive layer, and the pattern adhesive layer has a unique configuration, e.g., it is configured with the honeycomb pattern as the unit pattern.

Therefore, the adhesive force and the light distribution property are secured, and thus the integration structure of the optical parts of the backlight unit can be effectively achieved according to the embodiments of the present invention.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
    a light guide plate that includes a light entering surface facing a light source;
    a reflecting plate below the light guide plate;
    an optical sheet on the light guide plate;
    a liquid crystal panel on the optical sheet; and
    a pattern adhesive layer that attaches at least one of the reflecting plate and the optical sheet to the light guide plate,
    wherein the pattern adhesive layer includes honeycomb shaped unit patterns, each of the unit patterns including two first separation walls facing each other in a first direction perpendicular to the light entering surface, second separation walls other than the first separation walls, and an air cell defined therein, the first and second separation walls being transparent,
    wherein the unit patterns are arranged in the first direction and in a second direction perpendicular to the first direction,
    wherein the each of the unit patterns includes at least one apex in the second direction, and
    wherein adjacent unit patterns share the at least one apex in the second direction.

2. The liquid crystal display device of claim 1, wherein the unit pattern is configured to satisfy a following condition:

$$4\% \leq (2w/p)*100\% \leq 5\%,$$

where w is a width of each of the first and second separation walls, and p is a pitch of the unit pattern in the first direction.

3. The liquid crystal display device of claim 1, wherein the unit pattern is configured to satisfy a following condition:

$$w \leq h \leq 2w,$$

where w is a width of each of the first and second separation walls, and h is a height of each of the first and second separation walls.

4. The liquid crystal display device of claim 1, wherein the light guide plate further includes a light output pattern at a bottom surface thereof, and the light output pattern is located in the air cell.

5. The liquid crystal display device of claim 1, wherein the light guide plate is made of glass.

6. The liquid crystal display device of claim 1, further comprising a protection film attached to a bottom surface of the reflecting plate and having a pattern at an outer surface thereof.

7. The liquid crystal display device of claim 1, wherein the first and second separation walls are formed of an optically clear adhesive.

8. A liquid crystal display device, comprising:
    a light guide plate that includes a light entering surface facing a light source;
    a reflecting plate below the light guide plate;
    an optical sheet on the light guide plate;
    a liquid crystal panel on the optical sheet; and
    a pattern adhesive layer that attaches at least one of the reflecting plate and the optical sheet to the light guide plate,
    wherein the pattern adhesive layer includes honeycomb shaped unit patterns, each of the unit patterns including two first separation walls facing each other in a first direction perpendicular to the light entering surface, second separation walls other than the first separation walls, and an air cell defined therein, the first and second separation walls being transparent,
    wherein the unit patterns are arranged in the first direction and in a second direction perpendicular to the first direction, and
    wherein the second separation walls of adjacent unit patterns form tetragonal air cells.

9. The liquid crystal display device of claim 1, wherein the two first separation walls of the each of the unit patterns that are adjacent are aligned.

* * * * *